United States Patent
Yang (10) Patent No.: US 10,027,561 B2
(45) Date of Patent: Jul. 17, 2018

(54) M2M-BASED TICKET APPLICATION METHOD AND SYSTEM, AND TERMINAL DEVICE

(71) Applicant: ZTE Corporation, Shenzhen, Guangdong (CN)

(72) Inventor: Kun Yang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 232 days.

(21) Appl. No.: 14/899,673

(22) PCT Filed: Nov. 13, 2013

(86) PCT No.: PCT/CN2013/087092
§ 371 (c)(1),
(2) Date: Dec. 18, 2015

(87) PCT Pub. No.: WO2014/201799
PCT Pub. Date: Dec. 24, 2014

(65) Prior Publication Data
US 2016/0156530 A1    Jun. 2, 2016

(30) Foreign Application Priority Data
Jun. 20, 2013  (CN) .......................... 2013 1 0248044

(51) Int. Cl.
*G06F 15/177* (2006.01)
*H04L 12/24* (2006.01)
(Continued)

(52) U.S. Cl.
CPC ......... *H04L 41/5096* (2013.01); *G06Q 10/02* (2013.01); *H04M 15/41* (2013.01); *H04W 4/38* (2018.02); *H04W 4/70* (2018.02)

(58) Field of Classification Search
USPC ................................ 709/220, 230, 223, 246
See application file for complete search history.

(56) References Cited

U.S. PATENT DOCUMENTS 9,600,056 B2 * 3/2017 Ino ...................... G06F 1/3231
2002/0059432 A1 * 5/2002 Masuda .............. H04L 47/2408
709/227
(Continued)

FOREIGN PATENT DOCUMENTS

CN    101042762 A    9/2007
CN    101329774 A    12/2008
(Continued)

OTHER PUBLICATIONS

Supplementary European Search Report in European application No. 13887311.2, dated May 27, 2016.
(Continued)

*Primary Examiner* — Lan-Dai T Truong
(74) *Attorney, Agent, or Firm* — Oppedahl Patent Law Firm LLC (57) ABSTRACT

Provided are an M2M-based ticket application method, an M2M-based ticket application system, and a terminal. The method includes that after completing a registration onto an electronic ticket M2M platform, an electronic ticket M2M terminal sends a service request message to the electronic ticket M2M platform; after processing the service request message, the electronic ticket M2M platform sends a service request message to an electronic ticket M2M application; and after processing the service request message, the electronic ticket M2M application sends a service response message to the electronic ticket M2M terminal. The electronic ticket M2M terminal in the system is configured to send a service request message to the electronic ticket M2M platform after completing a registration onto the electronic ticket M2M platform.

19 Claims, 2 Drawing Sheets

(51) Int. Cl.
*H04W 4/70* (2018.01)
*H04W 4/38* (2018.01)
*G06Q 10/02* (2012.01)
*H04M 15/00* (2006.01)

(56) References Cited

U.S. PATENT DOCUMENTS

| | | | |
|---|---|---|---|
| 2011/0213871 A1 | 9/2011 | Digirolamo | |
| 2013/0151852 A1* | 6/2013 | Bian | H04W 12/06 713/168 |
| 2013/0227036 A1* | 8/2013 | Kang | H04L 65/40 709/206 |
| 2014/0351312 A1* | 11/2014 | Lu | H04W 4/005 709/201 |

FOREIGN PATENT DOCUMENTS

| | | |
|---|---|---|
| CN | 102214323 A | 10/2011 |
| CN | 102479413 A | 5/2012 |
| CN | 202976172 U | 6/2013 |
| EP | 2466791 A1 | 6/2012 |

OTHER PUBLICATIONS

Machie-to-Machine communications (M2M);Functional architecture ;ETSI TS 102 690 V2-0-13 clean, ETSI Draft; ETSI TS 102 690 V2-0-13 Clean,European Telecommuncations Standards;Institute (ETSI) 650, Route Des Lucioles : F-06921 Sophia-Antipolis ; France,vol. SmartM2M, No. V2. 0 .13, dated May 15, 2013, pp. 1-328,XP014184336.

3rd Genera ti on Partnership pyoject;Technical Specification Group Services andSystem Aspects ; Study on enhancements for Machie-Type Communications (MTC) (Release12] "3GPP Draft; 22888-C00, 3rd Generation Partnership Project (3GPP ) , Mobi Le Competence Centre ; 650 Rouedeslucioles ; F-06921 Sophia" Antipolis Cedex ;Fance mailed on Mar. 21, 2013, XP050906526.

Interntional Search Report in international application No. PCT/CN2013/087092, dated Mar. 27, 2014.

English Translation of the Written Opinion of the International Search Authority in international application No. PCT/CN2013/087092, dated Mar. 27, 2014.

* cited by examiner

M2M-BASED TICKET APPLICATION METHOD AND SYSTEM, AND TERMINAL DEVICE

TECHNICAL FIELD

The present disclosure relates to a Machine-to-Machine/Man (M2M) technology, and in particular to an M2M-based ticket application method, an M2M-based ticket application system and a terminal.

BACKGROUND

The M2M system architecture is divided into an M2M application layer, an M2M service capability layer, an M2M communication network layer, an M2M terminal, a sensing extension layer, and a management support system.

M2M application layer: an M2M application interacts with an M2M service platform via a standardized interface, for querying and processing the data of a terminal and controlling and managing the terminal through the M2M service platform. The M2M service platform might support a variety of M2M applications, for example, medical health, smart home, intelligent measurement and so on; the M2M application might be provided by an operator, a system integrator, a service provider or a user.

M2M service capability layer: besides routing and addressing, authentication and authorization, Quality of Service (QoS) management, charging, safety and other public capabilities, the M2M service platform also provides M2M terminal and gateway management, M2M terminal peripheral and stub network management, subscription management, data management, service control and other service functions, and further provides a call function of existing network capability. Meanwhile, the M2M service platform provides an access function for an M2M terminal downwards and shields the access difference of various terminals through a uniform interface, provides an application access control function upwards and opens the capability of the M2M service platform to various applications through a uniform interface.

M2M communication network layer: this layer includes an access network and a core network, in which the access network provides a terminal access function, including 2G, 3G, wired, WLAN and other access ways, and the core network mainly provides a network communication and service bearing function.

M2M terminal and sensing extension layer: based on capability, the M2M terminal might be divided into two types: one type is an M2M terminal which can communicate with an M2M communication network, such an M2M terminal can access an M2M service platform through a communication network directly, can interact with the platform to complete the registration, authentication and authorization of the terminal, can provide sensing information needed by applications, can interact services with an application via the M2M service platform, and can receive the management for a terminal peripheral; the other type is an M2M gateway which can communicate with an M2M communication network and an M2M stub network, the M2M gateway, besides connecting the M2M stub network and a sensing device to a network, also can receive the management information for an M2M stub network node and convert protocols between the M2M stub network and the M2M communication network.

An electronic ticket is commonly known as a paperless electronic ticket, which is a significant technology and service innovation of the environmentally sound technology, and is an electronic ticket system developed for different industries with different functions, specifically referring to a comprehensive ticket management system integrating ticket sale, management, finance and ticket inspection. In view of the advantages of the M2M system, a combination of electronic ticket and M2M system might be considered; however, no such solution has been put forward so far.

SUMMARY

In view of this, the embodiments of the present disclosure are intended to provide an M2M-based ticket application method, an M2M-based ticket application system and a terminal, which combines electronic tickets and an M2M system effectively.

To this end, the technical solutions of the embodiments of the present disclosure are implemented as follows.

An M2M-based ticket application method is provided, including:

an electronic ticket M2M terminal sends a service request message to an electronic ticket M2M platform after the electronic ticket M2M terminal completes a registration onto the electronic ticket M2M platform;

after the electronic ticket M2M platform processes the service request message, the electronic ticket M2M platform sends a service request message to an electronic ticket M2M application; and after the electronic ticket M2M application processes the service request message, the electronic ticket M2M application sends a service response message to the electronic ticket M2M terminal.

After sending the service response message to the electronic ticket M2M terminal, the method may further include:

after the electronic ticket M2M terminal processes the service response message, the electronic ticket M2M terminal executes an operation indicated by the service response message, and feeds back an execution result of the operation to the electronic ticket M2M application via an execution feedback message; and after the electronic ticket M2M application processes the execution feedback message, the electronic ticket M2M application updates local application data.

The step of the electronic ticket M2M terminal completing a registration onto the electronic ticket M2M platform may include:

the electronic ticket M2M terminal sends a registration request message to the electronic ticket M2M platform, wherein the registration request message contains a terminal identity and a safety certificate of the electronic ticket M2M terminal;

the electronic ticket M2M platform parses the received registration request message, searches for an application port number of a corresponding electronic ticket M2M application according to the terminal identity after passing authentication and authorization according to the terminal identity and the safety certificate parsed out, and returns a registration confirmation message containing the application port number to the electronic ticket M2M terminal, to complete the registration.

The service request message may at least include an application port number, a service type, service request data, and a terminal identity.

The service request data may include information collection data and/or information input data.

The information collection data may include ticket information and/or user information;

the information collection data is acquired by the electronic ticket M2M terminal through an information collection apparatus of the electronic ticket M2M terminal, or acquired by an electronic ticket M2M gateway through an information collection terminal peripheral in an electronic ticket M2M stub network.

The information input data may include ticket information and/or user information;

the information input data is acquired by inputting the information input data by a user through an information input apparatus of the electronic ticket M2M terminal, or acquired by inputting the information input data by a user through an information input terminal peripheral in an electronic ticket M2M stub network.

The step of the electronic ticket M2M platform sending a service request message to an electronic ticket M2M application after processing the service request message may include:

the electronic ticket M2M platform parses the received service request message, and sends the processed service request message to a corresponding electronic ticket M2M application according to the application port number after authenticating an identified service type and encrypting the service request data.

The step of the electronic ticket M2M application processing the service request message may include:

the electronic ticket M2M application parses the received service request message, and locally creates or searches for application data with a ticket identity as an index according to an identified service type and service request data.

The service response message may at least include a terminal identity, a service type, service response data.

The service response data may at least include a ticket identity, a processing result of the service request message, additional information data.

The step of the electronic ticket M2M terminal executing an operation indicated by the service response message after processing the service response message may include:

the electronic ticket M2M terminal parses the received service response message, identifies the service type, reads the processing result of the service request message in the service response data and executes the operation.

The execution feedback message may at least include an application port number, a service type, execution feedback data.

The execution feedback data may at least include a ticket identity, an execution result of executing the operation, additional information data.

An M2M-based ticket application system is provided, including:

an electronic ticket M2M terminal, which is configured to send a service request message to an electronic ticket M2M platform after completing a registration onto the electronic ticket M2M platform;

an electronic ticket M2M platform, which is configured, after the electronic ticket M2M platform processes the service request message, send a service request message to an electronic ticket M2M application; and an electronic ticket M2M application, which is configured to send a service response message to the electronic ticket M2M terminal after the electronic ticket M2M application processes the service request message.

The electronic ticket M2M terminal may be further configured to execute an operation indicated by the service response message after the electronic ticket M2M terminal processes the service response message, and to feed back an execution result of the operation to the electronic ticket M2M application via an execution feedback message; and the electronic ticket M2M application is further configured to update the local application data after the electronic ticket M2M application processes the execution feedback message.

The electronic ticket M2M terminal may be further configured to send a registration request message to the electronic ticket M2M platform, the registration request message containing a terminal identity and a safety certificate of the electronic ticket M2M terminal; and the electronic ticket M2M platform is further configured to parse the received registration request message, to search for an application port number of a corresponding electronic ticket M2M application according to the terminal identity after passing the authentication and authorization according to the terminal identity and the safety certificate parsed out, and to return a registration confirmation message containing the application port number to the electronic ticket M2M terminal to complete the registration.

The electronic ticket M2M platform may be further configured to parse the received service request message, the service request message at least including an application port number, a service type, service request data and a terminal identity, and, to send the processed service request message to a corresponding electronic ticket M2M application according to the application port number after authenticating an identified service type and encrypting the service request data.

The electronic ticket M2M application may be further configured to parse the received service request message, and to locally build or search for application data with a ticket identity as an index according to the identified service type and the service request data.

The electronic ticket M2M terminal may be further configured to parse the received service response message, the service response message at least including a terminal identity, a service type and service response data, the service response data at least including a ticket identity, a processing result of the service request message, additional information data; and configured to identify a service type, read the processing result of the service request message in the service response data and execute the operation.

The electronic ticket M2M terminal may be further configured to send an execution feedback message after executing the operation, the execution feedback message at least including an application port number, a service type and execution feedback data, the execution feedback data at least including a ticket identity, an execution result of executing the operation and additional information data.

A terminal is provided, which is an electronic ticket M2M terminal, including:

a sending unit, which is configured to send a service request message to an electronic ticket M2M platform after completing a registration onto the electronic ticket M2M platform; and a receiving unit, which is configured to receive a service response message returned from an electronic ticket M2M application.

The sending unit and the receiving unit can be realized by a Central Processing Unit (CPU), a Digital Signal Processor (DSP) or a Field-Programmable Gate Array (FPGA) while executing processing.

The electronic ticket M2M terminal may further include:

a feedback unit, which is configured to, after processing the service response message and executing an operation indicated by the service response message, feed back an execution result of the operation to the electronic ticket M2M application via an execution feedback message.

The feedback unit also can be realized by a CPU, a DSP or an FPGA while executing processing.

The sending unit may be further configured to send a registration request message to the electronic ticket M2M platform, the registration request message containing a terminal identity and a safety certificate of the electronic ticket M2M terminal; and the receiving unit is further configured to receive a registration confirmation message returned from the electronic ticket M2M platform to complete the registration.

The electronic ticket M2M terminal may further include:

a parsing and processing unit, which is configured to parse the received service response message, the service response message at least including a terminal identity, a service type and service response data, the service response data at least including a ticket identity, a processing result of the service request message, additional information data; and configured to identify a service type, read the processing result of the service request message in the service response data and execute the operation, and send the execution result of the operation to the feedback unit.

The parsing and processing unit also can be realized by a CPU, a DSP or an FPGA while executing processing.

The feedback unit may be further configured to send an execution feedback message after executing the operation, the execution feedback message at least including an application port number, a service type and execution feedback data, the execution feedback data at least including a ticket identity, an execution result of executing the operation and additional information data.

The method provided by the embodiment of the present disclosure includes that after completing a registration onto an electronic ticket M2M platform, an electronic ticket M2M terminal sends a service request message to the electronic ticket M2M platform; after processing the service request message, the electronic ticket M2M platform sends a service request message to an electronic ticket M2M application; and after processing the service request message, the electronic ticket M2M application sends a service response message to the electronic ticket M2M terminal. The embodiment of the present disclosure combines electronic tickets and an M2M system effectively and fully takes the advantage of the M2M system architecture in the field of electronic tickets.

DETAILED DESCRIPTION

The implementation of the technical solution is described below in further detail in conjunction with accompanying drawings.

An M2M-based ticket application method mainly includes the following content.

Figure 1:
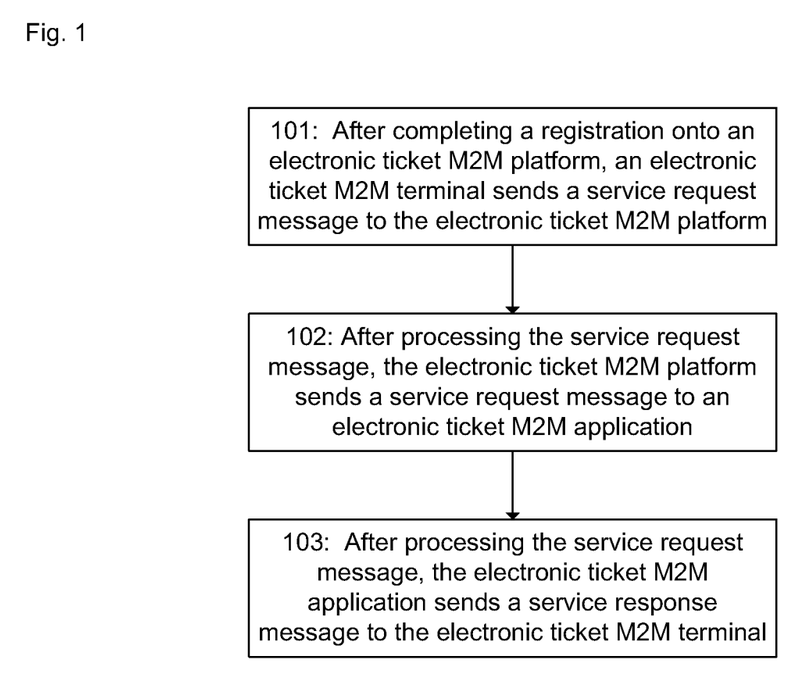
FIG. 1 is an implementation flowchart of the principle of a method according to an embodiment of the present disclosure.

As shown in FIG. 1, the method includes the following steps:

Step 101 is that after completing a registration onto an electronic ticket M2M platform, an electronic ticket M2M terminal sends a service request message to the electronic ticket M2M platform.

Here, the method further includes a registration process before Step 101: (1) the electronic ticket M2M terminal sends a registration request message to the electronic ticket M2M platform after the electronic ticket M2M terminal is started, wherein the registration request message includes a terminal identity and a safety certificate of the electronic ticket M2M terminal; (2) after receiving the registration request message, the electronic ticket M2M platform authenticates and authorizes the electronic ticket M2M terminal according to the terminal identity and the safety certificate; after the electronic ticket M2M terminal passes the authorization, the electronic ticket M2M platform searches the locally stored information for subscription information corresponding to the electronic ticket M2M terminal according to the terminal identity, wherein the subscription information includes an application port number of the electronic ticket M2M application associated with the electronic ticket M2M terminal; then the electronic ticket M2M platform sends the application port number to the electronic ticket M2M terminal via a registration confirmation message, to complete the registration of the electronic ticket M2M terminal onto the electronic ticket M2M platform.

Here, in Step 101, the service request message at least includes an application port number, a service type, service request data, and a terminal identity.

Here, the service type at least includes any one of followings: ticket sale, ticket inspection and management.

Here, the service request data includes information collection data and/or information input data.

The type of the information collection data includes ticket information and/or user information. The information collection data is acquired by the electronic ticket M2M terminal through an information collection apparatus of the electronic ticket M2M terminal, for example, a Radio Frequency Identification (RFID) apparatus, a bar code scanning apparatus, a facial recognition apparatus and the like; or, the information collection data is acquired by an electronic ticket M2M gateway through an information collection terminal peripheral in an electronic ticket M2M stub network.

The type of the information input data includes ticket information and/or user information. The information input data is acquired by inputting the information input data by a user through an information input apparatus of the electronic ticket M2M terminal, for example, a keyboard, a mouse, a touch screen and the like; or, the information input data is acquired by inputting the information input data by a user through an information input terminal peripheral in an electronic ticket M2M stub network.

Step 102 is that after processing the service request message, the electronic ticket M2M platform sends a service request message to an electronic ticket M2M application.

Here, the service request message to be processed by the electronic ticket M2M platform actually is a first service request message, which is processed to obtain a second service request message; the service request message sent by the electronic ticket M2M platform to the electronic ticket M2M application actually is the second service request message. That is to say, the second service request message is obtained after the processing of the first service request message; no further description is needed here.

Here, in Step 102, considering the electronic ticket M2M platform is a safe transmission apparatus between the electronic ticket M2M terminal and the electronic ticket M2M application, the electronic ticket M2M platform is required to have a safety mechanism; therefore, the step of the electronic ticket M2M platform processing the service request message includes: after receiving the service request message, the electronic ticket M2M platform parses the service request message to obtain an application port number, a service type, service request data and a terminal identity contained in the service request message, and then authenticates the service type parsed out from the service request message and encrypts the service request data.

Here, in Step 102, the step of sending a service request message to the electronic ticket M2M application includes: sending, according to the application port number in the service request message, the processed service request message to the electronic ticket M2M application corresponding to the application port number.

Step 103 is that after processing the service request message, the electronic ticket M2M application sends a service response message to the electronic ticket M2M terminal.

Here, in Step 103, the step of the electronic ticket M2M application processing the service request message includes: after receiving the service request message, the electronic ticket M2M application parses the service request message to obtain the application port number, service type, service request data and terminal identity contained in the service request message, identifies the service type in the service request message, and packages the service response data generated into the service response message.

Here, in Step 103, the step of sending a service response message to the electronic ticket M2M terminal includes: according to the terminal identity, sending the processed service response message to the corresponding electronic ticket M2M terminal.

Here, the service response message at least includes the terminal identity, the service type, service response data.

Here, the service response data at least includes the ticket identity, a processing result of the service request message, additional information data.

The ticket identity is a ticket identity generated by the electronic ticket M2M application.

Here, the processing result of the service request message includes the operation that the electronic ticket M2M terminal is indicated to execute according to the service type.

Here, the additional information data includes the information needed by the operation that the electronic ticket M2M terminal is indicated to execute according to the service type.

Here, after Step 103, the method further includes: the electronic ticket M2M terminal executes the indicated operation according to the service response message, and feeds back, after executing the operation, an execution result of the operation to the electronic ticket M2M application through an execution feedback message via the electronic ticket M2M platform to complete the data update of the M2M application.

The process of the electronic ticket M2M terminal executing the indicated operation according to the service response message includes: the terminal receives and parses the service response message, to obtain the terminal identity, service type and service response data contained in the service response message, identifies the service type in the service response message, reads the service response data, and executes a corresponding operation according to the processing result of the service request message in the service response data.

The process of the electronic ticket M2M terminal feeding back, after executing the operation, the execution result of the operation to the electronic ticket M2M application through an execution feedback message via the electronic ticket M2M platform to complete the data update of the M2M application includes: (1) the electronic ticket M2M platform receives and parses the execution feedback message, identifies the service type in the execution feedback message, and sends an execution feedback message to the electronic ticket M2M application according to the application port number in the execution feedback message; (2) the electronic ticket M2M application receives and parses the execution feedback message, identifies the service type in the execution feedback message, searches the locally stored data for corresponding application data according to the ticket identity in the execution feedback message, and updates the corresponding application data according to the additional information data in the execution feedback message.

Here, the execution feedback message at least includes an application port number, a service type, execution feedback data.

Here, the execution feedback data at least includes a ticket identity, an execution result of the service response message, additional information data.

The ticket identity is a ticket identity generated by the electronic ticket M2M application.

The execution result of the service response message includes the operation execution result obtained after the electronic ticket M2M terminal is indicated to execute the operation according to the service type.

Here, the additional information data includes the information generated when the electronic ticket M2M terminal finishes executing the operation according to the service type.

Figure 2:
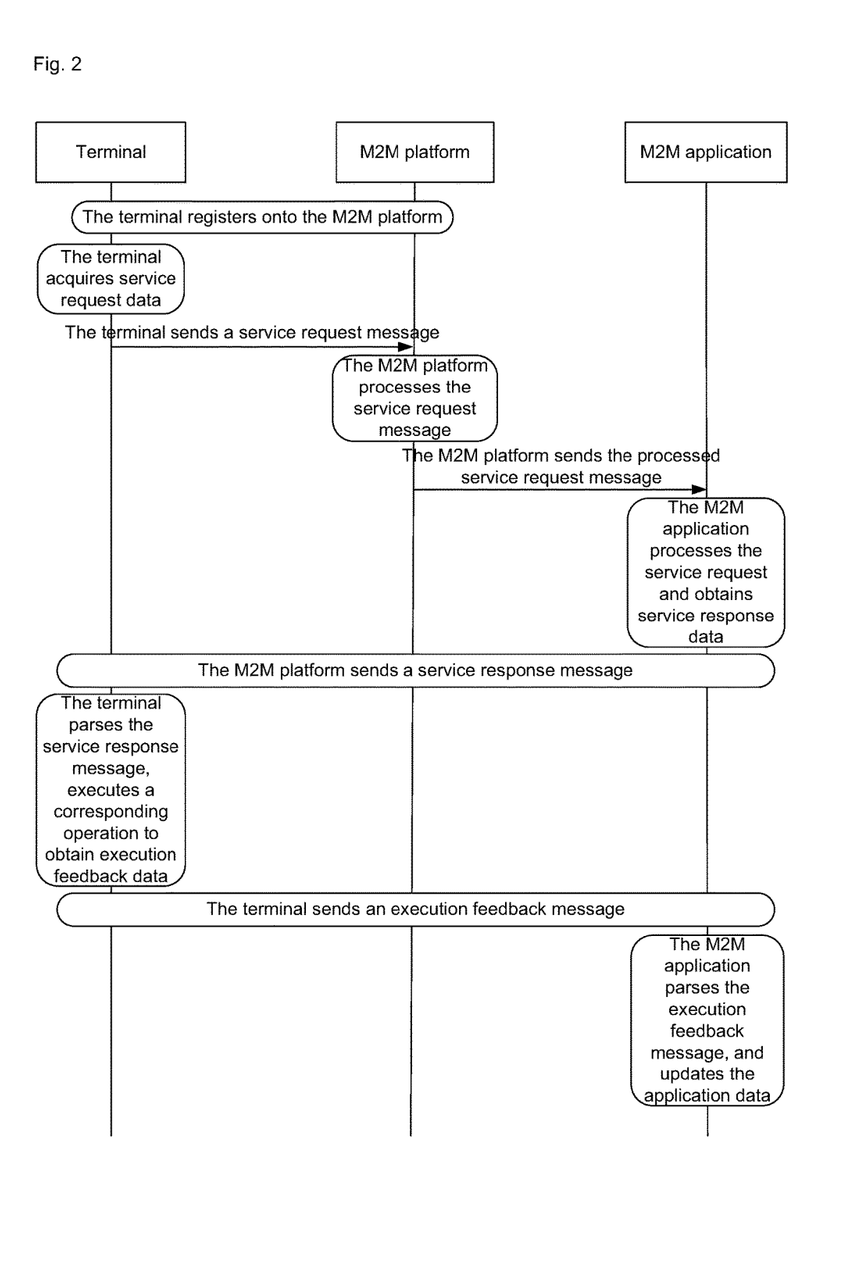
FIG. 2 is an implementation flowchart of the embodiment of the present disclosure.

For the M2M-based ticket application method provided in the embodiment of the present disclosure, as shown in FIG. 2, the principle flow containing the application data update includes: (1) an electronic ticket M2M terminal registers onto an electronic ticket M2M platform; (2) the electronic ticket M2M terminal acquires service request data; (3) the electronic ticket M2M terminal sends a service request message; (4) the electronic ticket M2M platform processes the service request message; (5) the electronic ticket M2M platform sends the processed service request message; (6) an electronic ticket M2M application processes the service request and obtains service response data; (7) the electronic ticket M2M platform sends a service response message; (8) the electronic ticket M2M terminal parses the service response message, executes a corresponding operation to obtain execution feedback data; (9) the electronic ticket M2M terminal sends an execution feedback message; (10) the electronic ticket M2M application parses the execution feedback message, and updates the local application data.

An M2M-based ticket application system mainly includes the following:

an electronic ticket M2M terminal, which is configured to send a service request message to an electronic ticket M2M platform after completing a registration onto the electronic ticket M2M platform;

an electronic ticket M2M platform, which is configured to send the service request message to an electronic ticket M2M application after processing the service request message;

an electronic ticket M2M application, which is configured to send a service response message to the electronic ticket M2M terminal after processing the service request message.

A terminal mainly includes the following:

specifically, the terminal is an electronic ticket M2M terminal and includes:

a sending unit, which is configured to send a service request message to an electronic ticket M2M platform after completing a registration onto the electronic ticket M2M platform; and a receiving unit, which is configured to receive a service response message returned from an electronic ticket M2M application.

To sum up, the embodiment of the present disclosure realizes an effective combination of the M2M technology and the electronic ticket technology, and provides a uniform and safe service platform for different electronic ticket applications and terminals through an M2M system.

The present disclosure is illustrated with following examples; for a simple description, the electronic ticket M2M terminal is called a terminal for short, the electronic ticket M2M platform is called an M2M platform for short, and the electronic ticket M2M application is called an M2M application for short. In addition, in the embodiment of the present disclosure, the electronic ticket M2M terminal is a smart ticket M2M terminal, the electronic ticket M2M platform is a smart ticket M2M platform, and the electronic ticket M2M application is a smart ticket M2M application.

Embodiment 1 the service type is ticket sale; this embodiment of the present disclosure is a scene that an M2M system supporting the electronic ticket technology implements a ticket sale service; this embodiment includes the following content:

1. A terminal initiates a registration request to an M2M platform after the terminal is started, the registration request message including a terminal identity and a safety certificate of the terminal.

2. After authenticating and authorizing the terminal, the M2M platform searches for, according to the terminal identity, subscription information corresponding to the terminal identity in the locally stored information, and sends the subscription information to the terminal via a registration confirmation message, wherein the subscription information includes the application port number of the M2M application associated with the terminal.

3. After completing the registration, the terminal initiates a service request message to the M2M platform, the service request message including the content as shown in Table 1.

TABLE 1

| Information Element | Comment |
| --- | --- |
| Application port number | An application port number allocated to a smart ticket M2M application by a smart ticket M2M platform |
| Service type | For indicating the service type of a request, including ticket sale, management, ticket inspection and so on |
| Service request data | For bearing information data needed by the service request |
| Terminal identity | The identity of a smart ticket M2M terminal or gateway in the smart ticket M2M system |

The service type is set as "ticket sale"; the service request data bears information collection data and/or information input data.

It should be noted that the information collection data might be ticket information and/or user information, which may be acquired by a terminal through an information collection apparatus of the terminal, for example, a RFID apparatus, a bar code scanning apparatus, a facial recognition apparatus and the like, or may be acquired by an electronic ticket M2M gateway through an information collection terminal peripheral in an electronic ticket M2M stub network.

The information input data might be ticket information and/or user information, which may be input by a user through an information input apparatus of the terminal, for example, a keyboard, a mouse, a touch screen and the like, or may be input by a user through an information input terminal peripheral in an electronic ticket M2M stub network.

4. The M2M platform receives and parses the service request message from the terminal, and sends, after authenticating the service type in the service request message and encrypting the service request data, the processed service request message to the M2M application according to the application port number in the service request message.

5. The M2M application receives and parses the service request message, identifies the service type, and creates in the locally stored data the corresponding application data according to the ticket information and/or user information in the service request message, the application data including a ticket identity. After creating locally the application data with the ticket identity as an index, the M2M application sends a service response message to the M2M platform, the service response message including the content as shown in Table 2.

TABLE 2

| Information Element | Comment |
| --- | --- |
| Terminal identity | The identity of a smart ticket M2M terminal or gateway in a smart ticket M2M system |
| Service type | For indicating the service type of a response, including ticket sale, management, ticket inspection and so on |
| Service response data | For bearing a ticket identity, a processing result of the service request, and additional information data |

The service type is set as "ticket sale"; the ticket identity is a generated ticket identity; the processing result of the service request includes a ticket sale "permission" or "prohibition" indication; the additional information data might include a seat number allocated by the application, a checked ticket price and so on.

6. The M2M platform receives and parses the service response message, identifies the service type, and sends the service response message to the terminal according to the terminal identity.

7. The terminal receives and parses the service response message, identifies the service type, reads the service response data, and executes corresponding operations according to the processing result of the service request, for example, payment operation.

8. After completing a corresponding operation, the terminal sends an execution feedback to the M2M platform, the execution feedback message including the content as shown in Table 3.

TABLE 3

| Information Element | Comment |
| --- | --- |
| Application port number | An application port number allocated to a smart ticket M2M application by a smart ticket M2M platform |

TABLE 3-continued

| Information Element | Comment |
| --- | --- |
| Service type | For indicating the service type of the feedback, including ticket sale, management, ticket inspection and so on |
| Execution feedback data | For bearing a ticket identity, a processing result of the service request, and additional information data |

The service type is set as "ticket sale"; the ticket identity is a generated ticket identity; the processing result of operation includes a "success" or "failure" indication; the additional information data might include a seat number selected by a user, a special requirement and so on.

9. The M2M platform receives and parses the execution feedback message, identifies the service type, and sends the execution feedback message to the M2M application according to the application port number.

10. The M2M application receives and parses the execution feedback message, identifies the service type, searches the locally stored data for the corresponding application data according to the ticket identity in the execution feedback data, and updates the corresponding application data according to the additional information data in the execution feedback data.

Embodiment 2 the service type is ticket inspection; this embodiment of the present disclosure is a scene that an M2M system supporting the electronic ticket technology implements a ticket inspection service; this embodiment includes the following content.

1. A terminal initiates a registration request to an M2M platform after the terminal is started, the registration request message including a terminal identity and a safety certificate of the terminal.

2. After authenticating and authorizing the terminal, the M2M platform searches for, according to the terminal identity, subscription information corresponding to the terminal identity in the locally stored information, and sends the subscription information to the terminal via a registration confirmation message, wherein the subscription information includes an application port number of the M2M application associated with the terminal.

3. After completing the registration, the terminal initiates a service request message to the M2M platform, the service request message including the content as shown in Table 4.

TABLE 4

| Information Element | Comment |
| --- | --- |
| Application port number | An application port number allocated to a smart ticket M2M application by a smart ticket M2M platform |
| Service type | For indicating the service type of a request, including ticket sale, management, ticket inspection and so on |
| Service request data | For bearing information data needed by the service request |
| Terminal identity | The identity of the smart ticket M2M terminal or gateway in the smart ticket M2M system |

The service type is set as "ticket inspection"; the service request data bears information collection data and/or information input data.

4. The M2M platform receives and parses the service request message from the terminal, and sends, after authenticating a service type in the service request message and encrypting the service request data, the processed service request message to the M2M application according to the application port number in the service request message.

5. The M2M application receives and parses the service request message, identifies the service type, and searches the locally stored data for corresponding application data according to the ticket identity in the service request data, the application data including ticket information and/or user information. After detecting the consistency between the application data stored locally and the information contained in the service request data contained by the service request message, the M2M application sends a service response message to the M2M platform, the service response message including the content as shown in Table 5.

TABLE 5

| Information Element | Comment |
| --- | --- |
| Terminal identity | The identity of a smart ticket M2M terminal or gateway in a smart ticket M2M system |
| Service type | For indicating the service type of a response, including ticket sale, management, ticket inspection and so on |
| Service response data | For bearing a ticket identity, a processing result of the service request, and additional information data |

The service type is set as "ticket inspection"; the ticket identity is a generated ticket identity; the processing result of the service request includes a ticket inspection "success" or "failure" indication; the additional information data might include a seat number allocated by the application, a provided service item and so on.

6. The M2M platform receives and parses the service response message, identifies the service type, and sends a service response message to the terminal according to the terminal identity.

7. The terminal receives and parses the service response message, identifies the service type, reads the service response data, and executes a corresponding operation according to the processing result of the service request, for example, access control.

8. After completing corresponding operation, the terminal sends a service feedback to the M2M platform, the execution feedback message including the content as shown in Table 6.

TABLE 6

| Information Element | Comment |
| --- | --- |
| Application port number | An application port number allocated to a smart ticket M2M application by a smart ticket M2M platform |
| Service type | For indicating the service type of a feedback, including ticket sale, management, ticket inspection and so on |
| Execution feedback data | For bearing a ticket identity, a processing result of the operation, and additional information data |

The service type is set as "ticket inspection"; the ticket identity is a generated ticket identity; the processing result of the operation includes a "success" or "failure" indication; the additional information data might include a seat number selected by a user, a service item and so on.

9. The M2M platform receives and parses the service response message, identifies the service type, and sends an execution feedback message to the M2M application according to the application port number.

10. The M2M application receives and parses the execution feedback message, identifies the service type, searches the locally stored data for corresponding application data according to the ticket identity in the execution feedback data, and updates corresponding application data according to the additional information data in the execution feedback data.

The above are the preferred embodiments of the present disclosure only, and are not intended to limit the scope of protection of the present disclosure.

INDUSTRIAL APPLICABILITY

The method provided by the embodiments of the present disclosure includes: after completing a registration onto an electronic ticket M2M platform, an electronic ticket M2M terminal sends a service request message to the electronic ticket M2M platform; after processing the service request message, the electronic ticket M2M platform sends a service request message to an electronic ticket M2M application; and after processing the service request message, the electronic ticket M2M application sends a service response message to the electronic ticket M2M terminal. The embodiment of the present disclosure combines electronic tickets and an M2M system effectively and fully takes the advantage of the M2M system architecture in the field of electronic tickets.

What is claimed is:

1. An M2M (Machine-to-Machine)-based ticket application method, comprising:
sending, by an electronic ticket M2M terminal, a service request message to an electronic ticket M2M platform after the electronic ticket M2M terminal completes a registration onto the electronic ticket M2M platform;
after the electronic ticket M2M platform processes the service request message, sending, by the electronic ticket M2M platform, a service request message to an electronic ticket M2M application; and
after the electronic ticket M2M application processes the service request message, sending, by the electronic ticket M2M application, a service response message to the electronic ticket M2M terminal;
after sending the service response message to the electronic ticket M2M terminal, the method further comprising:
after the electronic ticket M2M terminal processes the service response message, executing, by the electronic ticket M2M terminal, an operation indicated by the service response message, and feeding back, by the electronic ticket M2M terminal, an execution result of the operation to the electronic ticket M2M application via an execution feedback message; and
after the electronic ticket M2M application processes the execution feedback message, updating, by the electronic ticket M2M application, local application data.

2. The method according to claim 1, wherein the step of the electronic ticket M2M terminal completing a registration onto the electronic ticket M2M platform comprises:
sending, by the electronic ticket M2M terminal, a registration request message to the electronic ticket M2M platform, wherein the registration request message contains a terminal identity and a safety certificate of the electronic ticket M2M terminal;
parsing, by the electronic ticket M2M platform, the received registration request message, and, after passing authentication and authorization according to the terminal identity and the safety certificate parsed out, searching for, by the electronic ticket M2M platform, an application port number of a corresponding electronic ticket M2M application according to the terminal identity, and returning, by the electronic ticket M2M platform, a registration confirmation message containing the application port number to the electronic ticket M2M terminal, to complete the registration.

3. The method according to claim 1, wherein the service request message at least comprises an application port number, a service type, service request data, and a terminal identity.

4. The method according to claim 3, wherein the service request data comprises information collection data and information input data.

5. The method according to claim 4, wherein the information collection data comprises ticket information and user information;
the information collection data is acquired by the electronic ticket M2M terminal through an information collection apparatus of the electronic ticket M2M terminal, or acquired by an electronic ticket M2M gateway through an information collection terminal peripheral in an electronic ticket M2M stub network.

6. The method according to claim 4, wherein the information input data comprises ticket information and user information;
the information input data is acquired by inputting the information input data by a user through an information input apparatus of the electronic ticket M2M terminal, or acquired by inputting the information input data by a user through an information input terminal peripheral in an electronic ticket M2M stub network.

7. The method according to claim 3, wherein the step of the electronic ticket M2M platform sending a service request message to an electronic ticket M2M application after processing the service request message comprises:
parsing, by the electronic ticket M2M platform, the received service request message; and
after authenticating an identified service type and encrypting the service request data, sending, by the electronic ticket M2M platform, the processed service request message to a corresponding electronic ticket M2M application according to the application port number.

8. The method according to claim 3, wherein the step of the electronic ticket M2M application processing the service request message comprises:
parsing, by the electronic ticket M2M application, the received service request message; and
locally creating or searching for, by the electronic ticket M2M application, application data with a ticket identity as an index according to an identified service type and service request data.

9. The method according to claim 1, wherein the service response message at least comprises a terminal identity, a service type, service response data.

10. The method according to claim 9, wherein the service response data at least comprises a ticket identity, a processing result of the service request message, additional information data.

11. The method according to claim 10, wherein the step of the electronic ticket M2M terminal executing an operation indicated by the service response message after processing the service response message comprises:

parsing, by the electronic ticket M2M terminal, the received service response message;

identifying, by the electronic ticket M2M terminal, the service type;

reading, by the electronic ticket M2M terminal, the processing result of the service request message in the service response data; and executing, by the electronic ticket M2M terminal, the operation.

12. The method according to claim 11, wherein the execution feedback message at least comprises an application port number, a service type, execution feedback data.

13. The method according to claim 12, wherein the execution feedback data at least comprises a ticket identity, an execution result of executing the operation, additional information data.

14. An M2M (Machine-to-Machine)-based ticket application system, comprising:

an electronic ticket M2M terminal, which comprises: a first memory storing programming instructions; and a first processor configured to execute the stored programming instructions to perform steps comprising: sending a service request message to an electronic ticket M2M platform after completing a registration onto the electronic ticket M2M platform;

an electronic ticket M2M platform, which comprises: a second memory storing programming instructions; and a second processor configured to execute the stored programming instructions to perform steps comprising: after the electronic ticket M2M platform processes the service request message, sending a service request message to an electronic ticket M2M application; and an electronic ticket M2M application, which comprises: a third memory storing programming instructions; and a third processor configured to execute the stored programming instructions to perform steps comprising: sending a service response message to the electronic ticket M2M terminal after the electronic ticket M2M application processes the service request message;

wherein the first processor is configured to execute the stored programming instructions to perform steps further comprising: executing an operation indicated by the service response message after the electronic ticket M2M terminal processes the service response message, and feeding back an execution result of the operation to the electronic ticket M2M application via an execution feedback message;

wherein the third processor is configured to execute the stored programming instructions to perform steps further comprising: updating local application data after the electronic ticket M2M application processes the execution feedback message.

15. The system according to claim 14, wherein the first processor is configured to execute the stored programming instructions to perform steps further comprising: parsing the received service response message, the service response message at least comprising a terminal identity, a service type and service response data, the service response data at least comprising a ticket identity, a processing result of the service request message, additional information data; and identifying a service type, reading the processing result of the service request message in the service response data and execute the operation.

16. The system according to claim 14, wherein the first processor is configured to execute the stored programming instructions to perform steps further comprising: sending a registration request message to the electronic ticket M2M platform, the registration request message containing a terminal identity and a safety certificate of the electronic ticket M2M terminal; and wherein the second processor is configured to execute the stored programming instructions to perform steps further comprising: parsing the received registration request message, searching for an application port number of a corresponding electronic ticket M2M application according to the terminal identity after passing authentication and authorization according to the terminal identity and the safety certificate parsed out, and returning a registration confirmation message containing the application port number to the electronic ticket M2M terminal to complete the registration;

or, wherein the second processor is configured to execute the stored programming instructions to perform steps further comprising: parsing the received service request message, the service request message at least comprising an application port number, a service type, service request data and a terminal identity, and, sending the processed service request message to a corresponding electronic ticket M2M application according to the application port number after authenticating an identified service type and encrypting the service request data; wherein the third processor is configured to execute the stored programming instructions to perform steps further comprising: parsing the received service request message, and locally creating or searching for application data with a ticket identity as an index according to the identified service type and the service request data;

wherein the first processor is configured to execute the stored programming instructions to perform steps further comprising: sending an execution feedback message after executing the operation, the execution feedback message at least comprising an application port number, a service type and execution feedback data, the execution feedback data at least comprising a ticket identity, an execution result of executing the operation and additional information data.

17. A terminal, which is an electronic ticket M2M (Machine-to-Machine) terminal, comprising:

a first memory storing programming instructions; and a first processor configured to execute the stored programming instructions to perform steps comprising:

sending a service request message to an electronic ticket M2M platform after completing a registration onto the electronic ticket M2M platform; and receiving a service response message from an electronic ticket M2M application;

after processing the service response message and executing an operation indicated by the service response message, feeding back an execution result of the operation to the electronic ticket M2M application via an execution feedback message.

18. The terminal according to claim 17, wherein the first processor is configured to execute the stored programming instructions to perform steps further comprising:

parsing the received service response message, the service response message at least comprising a terminal identity, a service type and service response data, the service response data at least comprising a ticket identity, a processing result of the service request message, additional information data; and identifying a service type, read the processing result of the service request message in the service response data and execute the operation;

sending an execution feedback message after executing the operation, the execution feedback message at least comprising an application port number, a service type and execution feedback data, the execution feedback data at least comprising a ticket identity, an execution result of executing the operation, and additional information data.

19. The terminal according to claim 17, wherein the first processor is configured to execute the stored programming instructions to perform steps further comprising:

sending a registration request message to the electronic ticket M2M platform, the registration request message containing a terminal identity and a safety certificate of the electronic ticket M2M terminal; and receiving a registration confirmation message from the electronic ticket M2M platform to complete the registration.

* * * * *